US011376987B2

(12) United States Patent
Fischer (10) Patent No.: US 11,376,987 B2
(45) Date of Patent: Jul. 5, 2022

(54) SAFE POWERING OF TETHERED DRONE

(71) Applicant: T-Mobile USA, Inc., Bellevue, WA (US)

(72) Inventor: Steve Fischer, Fort Collins, CO (US)

(73) Assignee: T-MOBILE USA, INC., Bellevue, WA (US)

( * ) Notice: Subject to any disclaimer, the term of this patent is extended or adjusted under 35 U.S.C. 154(b) by 740 days.

(21) Appl. No.: 16/370,197

(22) Filed: Mar. 29, 2019

(65) Prior Publication Data
US 2020/0307407 A1 Oct. 1, 2020

(51) Int. Cl.
| | |
|---|---|
| *B60L 53/68* | (2019.01) |
| *B60L 53/66* | (2019.01) |
| *B64C 39/02* | (2006.01) |
| *B64F 1/36* | (2017.01) |
| *H02J 7/00* | (2006.01) |
| *H04W 72/10* | (2009.01) |
| *H04L 5/00* | (2006.01) |

(52) U.S. Cl.
CPC ............... *B60L 53/68* (2019.02); *B60L 53/66* (2019.02); *B64C 39/022* (2013.01); *B64C 39/024* (2013.01); *B64F 1/362* (2013.01); *H02J 7/0068* (2013.01); *H04L 5/0055* (2013.01); *H04W 72/10* (2013.01); *B60L 2200/10* (2013.01); *B64C 2201/066* (2013.01)

(58) Field of Classification Search
USPC ............................................................ 701/3
See application file for complete search history.

(56) References Cited

U.S. PATENT DOCUMENTS

| | | | |
|---|---|---|---|
| 2016/0083115 A1* | 3/2016 | Hess ..................... | B64C 39/022 701/3 |
| 2018/0012501 A1* | 1/2018 | Vander Lind .......... | G05D 1/101 |

* cited by examiner

*Primary Examiner* — Tyler D Paige
(74) *Attorney, Agent, or Firm* — Brownstein Hyatt Farber Schreck, LLP (57) ABSTRACT

A drone includes a propulsion system, a processing unit, and a power system having a battery and a power connection port. The power system is configured to receive packetized electrical power over a tether including an air-to-ground power feed attachable to the power connection port. The power system is also configured to supply electrical power to the processing unit, the battery, and the propulsion system. The processing unit is configured to acknowledge receipt of the packetized electrical power. A power delivery system includes a packetized electrical power transmitter and a processing unit. The processing unit is configured to operate the packetized electrical power transmitter to transmit packets of electrical power over a power feed within a tether attached to a drone. The processing unit is also configured to monitor a communication channel within the tether for acknowledgements indicating the drone has received the transmitted packets of electrical power.

20 Claims, 9 Drawing Sheets

SAFE POWERING OF TETHERED DRONE

FIELD

Embodiments described herein relate to the safe powering of a tethered drone (or tethered unmanned aerial vehicle). In some embodiments, the drone may be operable to provide wireless communication links (e.g., cellular radio communication links) with electronic communication devices (e.g., user equipment (UEs)). A tether connected to the drone may be operable to supply electrical power to the drone, and may also be operable to transmit communications between the drone and ground-based communication equipment. Embodiments disclosed herein generally relate to minimizing hazards associated with supplying electrical power to a tethered drone.

BACKGROUND

Electronic communication devices are commonplace in today's society. Example electronic communication devices (or UEs) include mobile phones, tablet computers, laptop computers, electronic watches, and other types of devices that are capable of communicating with each other, with web servers, or with equipment connected to various types of networks. Communications with a UE may be carried over a variety of wired or wireless networks, including circuit-switched networks (typically voice networks) and packet-switched networks (typically data networks). In some cases, a radio access network may connect a UE to a core network managed by a particular mobile carrier (e.g., a cellular service provider), or to various circuit-switched and/or packet-switched networks operated by the mobile carrier, other mobile carriers, or other service providers.

A radio access network may include, for example, a number of base station transceivers. A base station transceiver may establish and maintain wired or satellite communication links with core, circuit-switched, or packet-switched networks, and may establish wireless communication links with multiple UEs. A set of one or more base station transceivers (e.g., three base station transceivers) mounted on a tower and positioned to provide radio access for UEs within an angular extent about the tower (and in some cases, within an angular extent of 360° about the tower) may define a cell of a radio access network. When a cell is defined by multiple base station transceivers, each base station transceiver within the cell may define a sector of the cell. Alternatively, each sector may be considered a cell. As a UE moves from one cell to another cell, the UE's network connection(s) may be transferred (e.g., handed off) from a base station transceiver in one cell to a base station transceiver in another cell.

When a base station transceiver becomes inoperable for an extended period of time, such as when a natural disaster compromises the base station transceiver (or the tower on which it is mounted, or the equipment cabinet that connects the base station transceiver to a backhaul network, or the power or backhaul network that provides service to the equipment cabinet), the UEs of users entering the cell served by the inoperable base station transceiver may be unable to connect to other UEs or networks, and the users may perceive a network outage. To temporarily restore network access, an operator of a radio access network may deploy mobile communication equipment that provides temporary service for the cell (e.g., service for a number of days or weeks). Such mobile communication equipment may include, for example, an electrical power generator, a base station transceiver, and a temporary tower on which the base station transceiver is mounted. The mobile communication equipment may also include other types of equipment. The base station transceiver may connect to a ground-based satellite dish, or to a cable or fiber optic communication system, that connects that base station transceiver to a backhaul network.

SUMMARY

This summary is provided to introduce a selection of concepts, in simplified form, that are further described in other sections. This summary is not intended to identify key features or essential features of the claimed subject matter, nor is it intended to be used as an aid in determining the scope of the claimed subject matter.

The devices, methods, and systems described herein include drones or other unmanned aerial vehicles (UAVs), on-board power systems for a drone and/or a base station transceiver carried by a drone, and tethers or cables that may connect a power system or base station transceiver carried by a drone to a ground-based power delivery system and/or communication system. Also described are methods of operating a power delivery system for a drone.

The drones described herein may be configured to connect UEs to various communication networks, including radio access networks. For example, a drone may fly or hover at an altitude that enables UEs to communicate with a base station transceiver carried by the drone, and a tether connected to the drone may connect power and communication systems of the drone to ground-based power delivery and communication systems.

More specifically, described herein is a drone that includes a propulsion system, a processing unit, and a power system. The power system may include a battery and a power connection port. The power system may be configured to receive packetized electrical power from a base power system (e.g., a ground-based power system) that is exterior to the drone, with the packetized electrical power being received from the base power system over a tether including an air-to-ground power feed attached to the power connection port. The power system of the drone may be configured to supply electrical power to the processing unit, the battery, and the propulsion system. In various embodiments, the processing unit may be configured to monitor a value of a parameter of the received packetized electrical power, and transmit a power adjustment indicator (e.g., a cease transmission indicator) to the base power system upon detecting that the value of the parameter is not within a determined allowable range of values. The tether may in some cases include a communication channel that may be used by the processing unit to transmit and receive signals or messages to/from the base power system. The drone may also include a communication system operable to establish a communication link between an electronic communication device and a communication network.

Also described is a power delivery system that includes a processing unit and a packetized electrical power transmitter. The processing unit may be configured to operate the packetized electrical power transmitter to transmit packets of electrical power over a tether attached to a drone, and to monitor a communication channel within the tether for acknowledgements indicating the drone has received each transmitted packet of electrical power.

The processing unit of the power delivery system may also be configured to cause the packetized electrical power transmitter to adjust transmission (e.g., cease transmission or switch to a different kind of transmission mode) upon failure to detect at least one of the acknowledgements, or upon receiving a power adjustment indicator over the communication channel.

The power delivery system may also include a ground fault detection circuit, with the processing unit configured to cause the packetized electrical power transmitter to adjust transmission of the packets of electrical power upon receiving a ground fault detected indicator from the ground fault detection circuit. In some cases, the processing unit may be configured to cause the packetized electrical power transmitter to operate in a human warning mode upon receiving a ground fault detected indicator from the ground fault detection circuit.

The processing unit may be configured to cause the packetized electrical power transmitter to dynamically vary at least one parameter of the packets of electrical power. The at least one parameter may include at least one of: a transmitted power, a voltage amplitude, a packet time duration, a frequency, a duty cycle, a period of the packets of electrical power, or another parameter.

The present disclosure also describes a method of operating a power delivery system to supply packetized electrical power to a drone over a tether. The method may include causing the power delivery system to transmit packets of electrical power to the drone over the tether, and monitoring a communication channel between the power delivery system and the drone for acknowledgements indicating the drone has received the transmitted packets of electrical power.

The method may also include causing the power delivery system to adjust (e.g., cease) transmission of the packets of electrical power upon at least one of a failure to detect at least one of the acknowledgements, or a reception of a power adjustment transmission indicator received on the communication channel from the drone.

The method may also include monitoring a ground fault detection circuit of the power delivery system and causing the power delivery system to adjust transmission of the packets of electrical power upon detection of a ground fault by the ground fault detection circuit. In some cases, the power delivery system may operate in a human warning mode.

BRIEF DESCRIPTION OF THE DRAWINGS

The disclosure will be readily understood by the following detailed description in conjunction with the accompanying drawings, wherein like reference numerals designate like structural elements.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Some of the embodiments described herein are directed to devices, methods, and systems that may be used as part of a communication network (e.g., a radio access network). The communication network may operate to provide communication services to UEs. Examples of such services include voice, data, video, radio, television, and other communications sent electronically, either through physical or wired connections, or wirelessly using electromagnetic radiation (e.g., radio frequency (RF) electromagnetic radiation). Examples of UEs include mobile phones, tablet computers, laptop computers, electronic watches, and other types of devices that are capable of communicating with each other, with web servers, or with equipment connected to various types of networks.

More particularly, some of the embodiments described herein pertain to mobile communication equipment that can restore network access (e.g., UE access to a radio access network) when a base station transceiver of the radio access network is temporarily unavailable, as may be the case when a natural disaster (e.g., a hurricane, tornado, tsunami, flood, or fire) knocks out the base station transceiver, the tower on which it is mounted, the equipment cabinet that connects the base station transceiver to a backhaul or power source, and so on. In another application, such mobile communication equipment may be deployed to provide initial network access in an area while a permanent base station is under construction. Such mobile communication equipment may include a drone capable of hovering or flying above a local geographic area and operating a communication system that can establish a wireless communication link with UEs in that area. Such a drone may be connected by a tether or cable over which it can receive power, and through which it can establish another communication link with a communication network, such as the radio access network.

Some of the embodiments described herein are directed to devices, methods, and power delivery systems that may be used to provide electrical power to such drones. Such power delivery systems may be ground-based, and (along with a drone) may be transported by, or mounted on, mobile transport equipment. Once at a site, the drone can be launched with a tether attached to, and payed out from, the power delivery system. The power delivery system may in some cases include an electrical power generator or battery, and in some cases may include a connection to a power grid.

The power delivery system may provide packetized electrical power to a drone by transmitting, over the tether, electrical power in packets or pulses separated by quiescent intervals of time. The drone may receive the packetized electrical power and send acknowledgements to the power delivery system when it determines there were no problems in transmission or reception of the packetized electrical power. Since the power delivery system pauses transmission of electrical power between packets, a failure to receive an acknowledgement from the drone may indicate a potential problem in the delivery of the electrical power, and the power delivery system may adjust (and in some cases cease) transmission of electrical power. This can mitigate a potentially hazardous situation, such as a situation in which a person (i.e., a human) or object contacts the tether and causes an electrical short to ground.

The tether or cable connecting the power delivery system to the drone may contain wires, fiber, fiber-optics, or other elements that provide one or more power feeds, and one or more communication links, that connect the drone to the power delivery system and/or ground-based communication equipment. In some cases, the power delivery system and drone may also establish a wireless communication link.

The power delivery system may communicate with the drone (over either a physical or wireless communication link) to assess performance. The power delivery system may also have a ground fault detection circuit to detect undesirable conditions while transmitting power through the tether.

These and other embodiments are discussed below with reference to FIGS. 1-8B. However, those skilled in the art will readily appreciate that the detailed description given herein with respect to these figures is for explanatory purposes only and should not be construed as limiting.

Figure 1:
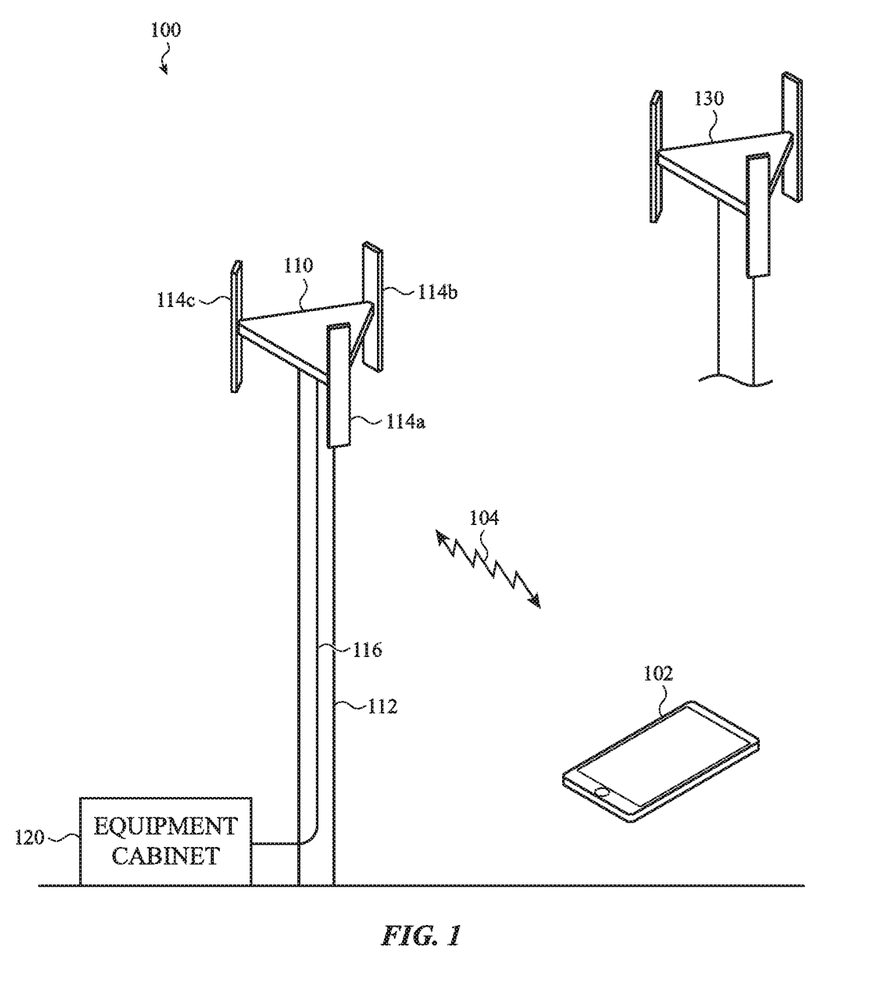
FIG. 1 illustrates components of a communication network.

FIG. 1 illustrates a selection of components in an exemplary communication network 100. By way of example, the communication network 100 is shown to be a cellular communication network, but the devices, methods, and systems described herein can be used in other types of communication networks.

The communication equipment included in the communication network 100 may include base stations 110, 130 and UEs 102. The base stations 110, 130 and UEs 102 may communicate via wireless communication links 104, and the base stations 110, 130 may transmit communications between the UEs 102 and one or more communication networks (e.g., a core network of a mobile carrier, a circuit-switched network (e.g., a voice network, which in some cases may carry data, such as text messages) or a packet-switched network (e.g., a data network, which in some cases may carry voice communications, such as voice-over-IP (VoIP) communications)). For purposes of this description, a base station is intended to include a Node B, an evolved Node B (eNB), or any other type of equipment installed at the edge of a radio access network for the purpose of communicating with UEs 102.

An example UE 102 is illustrated as a mobile phone, but may alternatively be any other type of electronic communication device that is capable of communicating over a wireless communication link, such as a tablet computer, laptop computer, electronic watch, and so on. While only one UE 102 is shown in FIG. 1, one or many UEs 102 (or no UEs 102) may communicate with each of the base stations 110, 130 shown in FIG. 1.

The wireless communication link 104 may be established using any one or more of a number of radio access technologies (RATs), including, for example, Bluetooth, Wi-Fi, Global System for Mobile communications (GSM), Universal Mobile Telecommunications System (UMTS), Long-Term Evolution (LTE), or 5G new radio (5G NR) RATs.

The wireless communication link 104 may allow one or both of reception and transmission of communication by the UE 102. For example, a mobile phone may both transmit and receive, whereas a remote sensor (e.g., a weather beacon or tracking device) may in some cases only transmit, and a broadcast device (e.g., a billboard) may in some cases only receive.

By way of example, two base stations 110, 130 of the communication network 100 are shown. Each base station 110, 130 may include a tower 112 that supports one or more antennas 114a, 114b, 114c and associated base station transceivers (e.g., radios that transmit and receive using the antennas 114a, 114b, 114c). The base station transceivers may be connected to equipment stored within an equipment cabinet 120 at the base of a tower 112. The equipment stored within the equipment cabinet 120 may include baseband switching equipment, signal filtering and conditioning equipment (e.g., power amplifiers, modulators, digital signal processing equipment, analog-to-digital converters, and so on), an electrical power supply (e.g., a battery) or power grid connection, and so on. An electrical power generator may also be located in or near the equipment cabinet 120. The base station transceivers may be connected to the equipment within the equipment cabinet 120 by one or more power feeds (e.g., a set of redundant power lines) and one or more communication channels (e.g., one or more copper, fiber, or fiber optic lines or cables) contained within one or more cables 116. In some embodiments, the cable(s) 116 may include one or more hybrid cables, which each contain both power feeds and communication channels.

In the example shown, the UE 102 may establish the wireless communication link 104 with one (or more) of the antennas 114a, 114b, 114c that provides the best signal strength for the UE 102. Additionally and/or alternatively, the UE 102 may establish multiple wireless communication links with both of the base stations 110, 130, such as during a hand-off as the UE 102 moves. Alternatively, the communication network 100 may determine which base station 110, 130 is allowed to communicate with the UE 102. The antennas 114a, 114b, 114c (and associated base station transceiver) with which the UE 102 communicates may also be determined by other means, or based on other parameters.

As previously mentioned, the equipment cabinet 120 may include various components for supporting the components (e.g., base station transceivers and antennas 114a, 114b, 114c) installed on top of, or otherwise mounted on, the tower 112. The components within the equipment cabinet 120 may also transmit communications between the base station transceivers and antennas 114a, 114b, 114c on the tower 112 and a backhaul network. A connection to the backhaul network may include copper (coax), fiber, fiber optic cables, or a satellite connection. The connection to the backhaul enables the UE 102 to communicate with other UEs, web servers, or other equipment connected to various types of networks.

Figure 2:
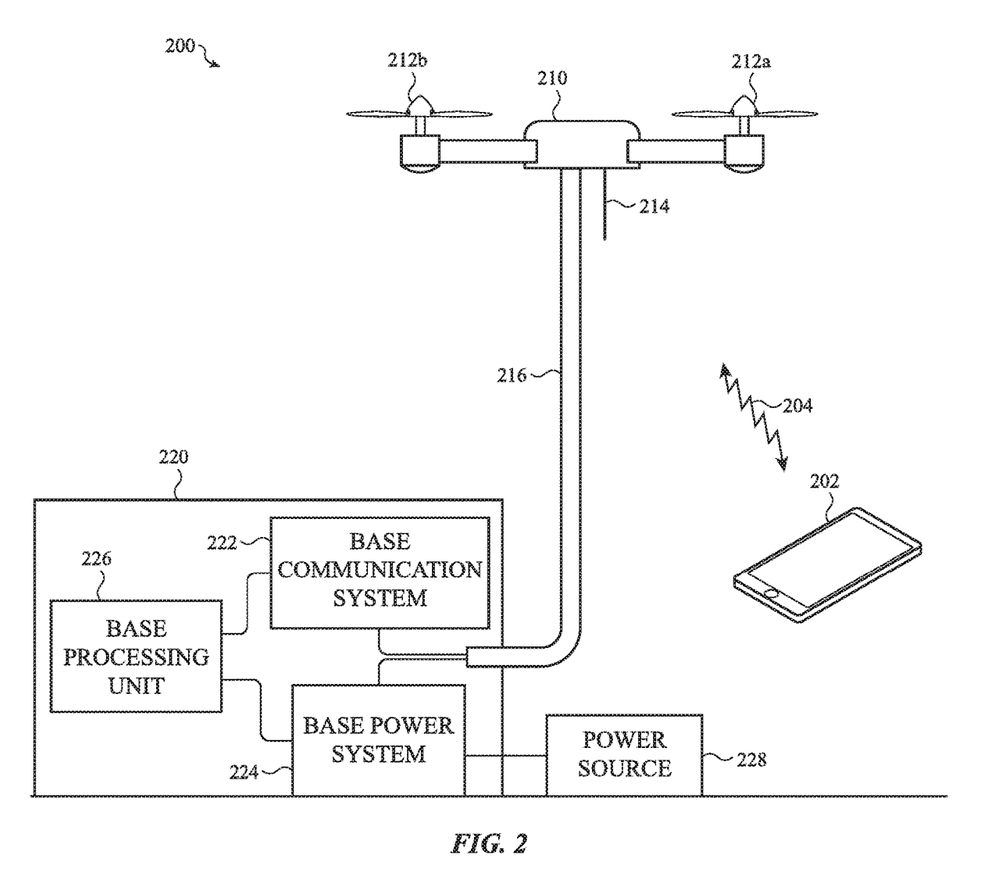
FIG. 2 illustrates a system of mobile communication equipment that can be used as part of the communication network of FIG. 1, according to an embodiment.

FIG. 2 illustrates exemplary mobile communication equipment 200 that may be used to temporarily replace one of the base stations described with reference to FIG. 1. For example, in the event that a base station becomes inoperable due to a natural disaster, the mobile communication equipment 200 may be deployed at or near a location of the inoperable base station (or elsewhere), and be operated as a substitute for the inoperable base station, so that UEs do not perceive a network outage. Alternatively, the mobile communication equipment 200 may be used in addition to the base stations described with reference to FIG. 1.

The mobile communication equipment 200 may include a drone 210 that is configured to fly or hover over or near ground-based mobile base station equipment (MBSE) 220. The drone 210 may be connected to the MBSE 220 by a tether 216 (e.g., a cable). The tether 216 may limit how high or far the drone 210 can move away from the MBSE 220. However, the primary purpose of the tether 216 is to supply the drone 210 with electrical power provided (and in some cases generated) by the MBSE 220. The tether 216 may include one or more power feeds therein for supplying such electrical power. In some cases, the tether 216 may include a set of redundant power feeds (e.g., six power feeds). The power feed(s) within the tether 216 may be connected between a power system of the drone 210 and a base power system 224 of the MBSE 220. The power feed(s) within the tether 216 may in some cases be referred to herein as air-to-ground power feeds.

The tether 216 may also include one or more data lines, signal lines, or other communication channels, which may carry different signals or data to improve the throughput of signal/data transfers through the tether 216, or carry the same or different versions of the same signals/data to improve the robustness (e.g., low error rate) of signal/data transfers through the tether 216. As described herein in relation to the tether 216, "data" may include signals or messages transmitted in circuit-switched or packet-switched networks, as well as various control signals transmitted outside of a network. The signal or data line(s) within the tether 216 may in some cases be connected between an avionics system or communication system (e.g., a base station transceiver) on-board the drone 210 and a base communication system 222 of the MBSE 220.

The drone 210 may include an on-board communication system (e.g., a base station transceiver, which may also be referred to as a mobile base station transceiver). The communication system on-board the drone 210 may establish a wireless communication link 204 with a UE 202 (or establish wireless communication links with multiple UEs 202) and connect the UE 202 (or UEs) to a backhaul network via the base communication system 222 of the MBSE 220.

The drone 210 may include an antenna 214, such as whip antenna, which may be used to establish the wireless communication link 204 and transmit/receive communications (e.g., signals or data) to/from the UE 202. In alternative embodiments, the drone 210 may have a greater number of antennas, or different types of antennas. The antenna 214 may be connected to the base station transceiver on-board the drone 210.

The drone 210 may be a pilotless aircraft (e.g., a UAV). The drone 210 may operate semi-autonomously, using computer-implemented instructions stored in the drone's avionics system. Additionally and/or alternatively, the drone 210 may receive instructions from an operator over a communication link. Such a communication link between the drone 210 and an operator may be established over a communication channel within the tether 216, or over a wireless communication link.

The drone 210 may fly or hover using a set of propellers, including propellers 212a and 212b. While only two propellers are shown in FIG. 2's elevation of the drone 210, the drone 210 may have four, six, eight, or any number of propellers. Alternatively, a drone may have a single central propeller. The propellers 212a, 212b may be powered by electrical power received over one or more power feeds included in the tether 216, or by a battery on-board the drone 210.

The MBSE 220 may be transportable by a vehicle (not shown) to a location where the drone 210 is launched. The MBSE 220 may receive power from a power source 228, such as an electrical power generator or electrical power grid. The power source 228 may be a mobile power source included as part of the MBSE 220, or a separate component or structure.

The MBSE 220 may include a base power system 224 that receives power, such as electrical power, provided by the power source 228. The base power system 224 may provide AC-to-DC conversion, DC-to-DC conversion, electrical power filtering and conditioning, and/or other functions to provide appropriate electrical powering of other components of the MBSE 220. The base power system 224 may also provide electrical power to the drone 210, through the tether 216.

The MBSE 220 may further include a base processing unit 226 (e.g., a discrete or distributed processor, a microprocessor, a microcontroller, a central processing unit (CPU), a peripheral interface controller (PIC), an application-specific integrated circuit (ASIC), a field programmable gate array (FPGA), or another form of processing unit), which may control and coordinate the operations and functions of the MBSE 220. In some cases, the base processing unit 226 may include control and/or computational components and/or circuits, such as automated control units, or analog or digital signal processing components. Together, the power source 228 and the MBSE 220 may be referred to herein as a power delivery system.

The MBSE 220 may also contain a base communication system 222, which may connect with a backhaul network. The base communication system 222 may transmit communications received from the backhaul network to the drone 210, over communication channels within the tether 216. The drone 210 may then transmit corresponding communications to the UE 202, over the wireless communication link 204. Additionally, the base communication system 222 may receive communications from the drone 210, over communication channels within the tether 216, and transmit corresponding communications over the backhaul network. In this manner, the base communication system 222 may provide the UE 202 with transmit and receive channels over the backhaul network. UEs 202 may communicate over the backhaul network, through the drone 210 and MBSE 220, while the drone 210 is connected to the MBSE 220 via the tether 216.

Figure 3:
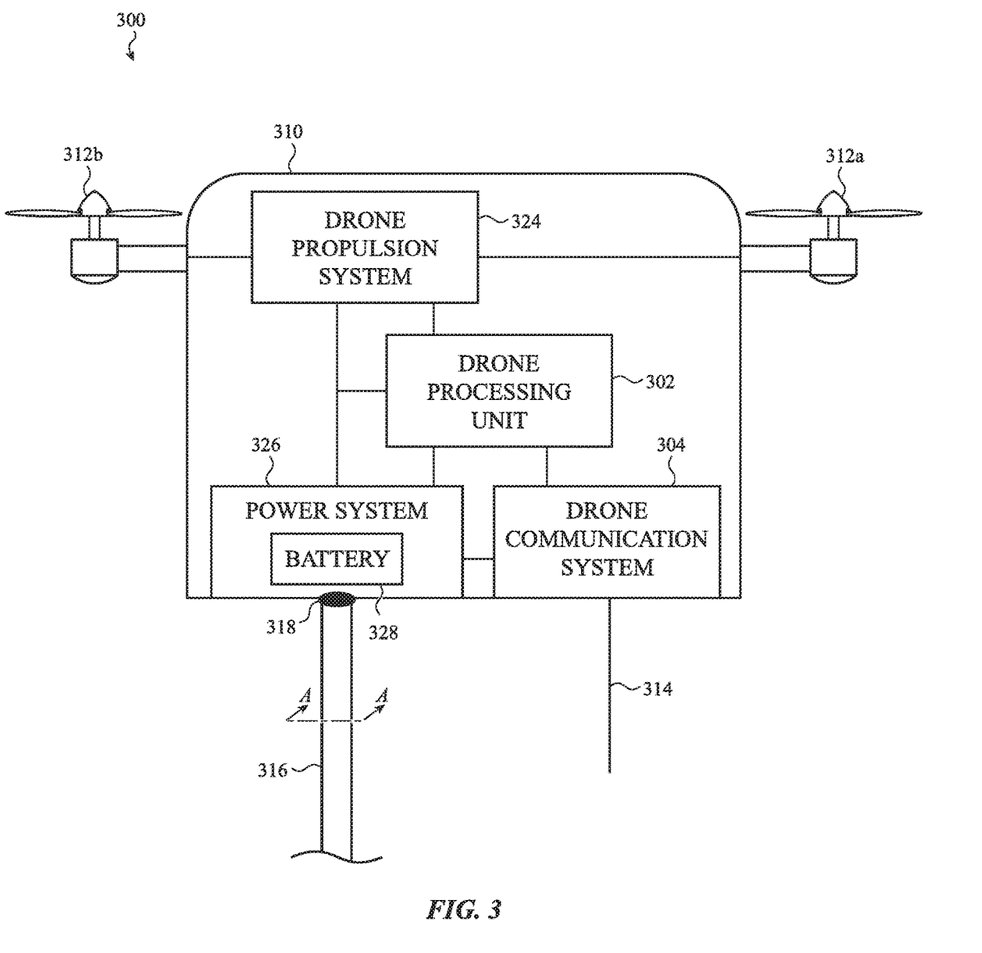
FIG. 3 illustrates components of a drone that can be used as a component of the mobile communication equipment of FIG. 2, according to an embodiment.

FIG. 3 shows an example of components and systems that may be included in a drone 310. The drone 310 is an example of the drone that forms a part of the mobile communication equipment described with reference to FIG. 2. The drone 310 may be configured to fly or hover using lift provided by a set of propellers, including propellers 312*a* and 312*b*. While just two propellers 312*a*, 312*b* are shown, the drone 310 may have any number of propellers.

The drone 310 may receive power from an air-to-ground (or, equivalently, "ground-to-air") power feed that may be a component of a tether 316. The air-to-ground power feed may include one or more wires or cables by which electrical power may be transmitted to the drone 310 from an external power delivery system (shown in FIG. 2, but not shown in FIG. 3). The tether 316 may also include signal lines, data lines, or other communication channels, and may take the form of a hybrid cable including both air-to-ground power feeds and communication channels. The tether 316 (or hybrid cable, or air-to-ground power feeds and/or communication channels) may connect to the drone 310 at one or more tether connection ports or power connection ports 318. The tether 316 can be connected to the tether connection port(s) or power connection port(s) 318 during a pre-launch phase, prior to deploying the drone 310, and may remain connected to the tether connection port(s) or power connection port(s) 318 as the drone 310 is flown. In some cases, the tether 316 may only be disconnected from the drone 310 after the drone 310 has landed, or under predetermined conditions when maintaining the connection is deemed unsafe.

The drone 310 may include a power system 326. The power system 326 may include circuitry that receives and conditions electrical power supplied over the tether 316, and may include circuitry that provides AC-to-DC conversion, DC-to-DC conversion, filtering, overvoltage protection, and other functionality. The power system 326 may be configured to supply the received and/or conditioned electrical power (from the tether 316) to other components and systems of the drone 310.

The power system 326 may include circuitry that monitors a battery 328 and charges the battery 328 using the received and conditioned electrical power. The battery 328 may include multiple parallel-connected battery cells that provide redundant power for components and systems of the drone 310. In some embodiments the circuitry may balance charge between the battery cells.

The drone 310 may include a drone processing unit 302 that includes, for example, one or more processors and memory units. The drone processing unit 302 may be configured to receive signals from various components and systems of the drone 310, and may provide control signals to such components and systems based on programs run on the processor(s). The drone processing unit 302 may be part of an avionics system of the drone 310.

The drone 310 may include a propulsion system 324 that provides lift and movement for the drone 310. In some embodiments, the propulsion system 324 may include the propellers 312*a*, 312*b*, and associated motors that operate the propellers 312*a*, 312*b*. An avionics system including the drone processing unit 302 may receive global positioning system (GPS) signals as part of controlling the flight operations of the drone 310. The propulsion system 324 may receive control signals from the drone processing unit 302, which control signals may cause the propulsion system 324 to perform specific flight operations, such as launch or landing operations.

The drone 310 may further include a drone communication system 304. The drone communication system 304 may be linked with an antenna 314, which may be a whip antenna as described with reference to FIG. 2. The drone communication system 304 may be operable to provide one or more wireless communication channels (such as cell phone channels or other wireless signaling) to electronic communication devices, such as the UE 202 of FIG. 2. The power system 326 may provide the drone communication system 304 with electrical power, using either the received and conditioned electrical power from the tether 316 or power received from the battery 328.

Figure 4:
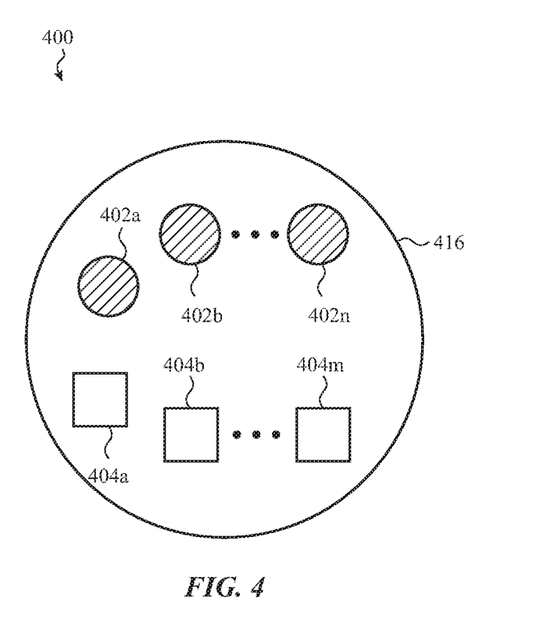
FIG. 4 illustrates a cross section of a hybrid cable that can be used as a component of the mobile communication equipment of FIG. 2, according to an embodiment.

FIG. 4 shows an example cross-section of a hybrid cable 400. The hybrid cable 400 may be an example of the tether 316 described with reference to FIG. 3. The cross-section may be taken along the cut line A-A' of FIG. 3. The hybrid cable 400 may include an outer sheath 416 and one or more sets of transmission components including power feeds 402 and communication channels 404. The power feeds 402 and communication channels 404 may link components of a drone (e.g., the drone 310 described with reference to FIG. 3) to components of a power delivery system (e.g., the MBSE 220 and power source 228 described with reference to FIG. 2). The hybrid cable 400 may also contain inert material (e.g., insulation) that provides electrical and physical spacing between the various power feeds 402 and communication channels 404.

A first set of transmission components included in the hybrid cable 400 may be a set of power feeds 402*a*, 402*b*, ... 402*n* (e.g., a set of electrical power supply lines). There may be one or more such power feeds 402*a*, 402*b*, ... 402*n*. The power feeds 402*a*, 402*b*, ... 402*n* may provide redundant electrical power to the drone 310, and particularly to its battery 328. In some embodiments, the power feeds 402*a*, 402*b*, ... 402*n* may include copper lines, coaxial cables, and so on.

A second set of transmission components included in the hybrid cable 400 may be a set of communication channels 404*a*, 404*b*, ... 404*m*. The communication channels 404*a*, 404*b*, ... 404*m* may connect to a drone communication system (e.g., the drone communication system 304 of the drone 310). The communication channels 404*a*, 404*b*, ... 404*m* may include fiber optic cables, twisted pair lines, coaxial cables, or other structures that may provide communication links between a drone communication system and a ground-based communication system (e.g., the base communication system 222 of the MBSE 220 described with reference to FIG. 2).

Figure 5:
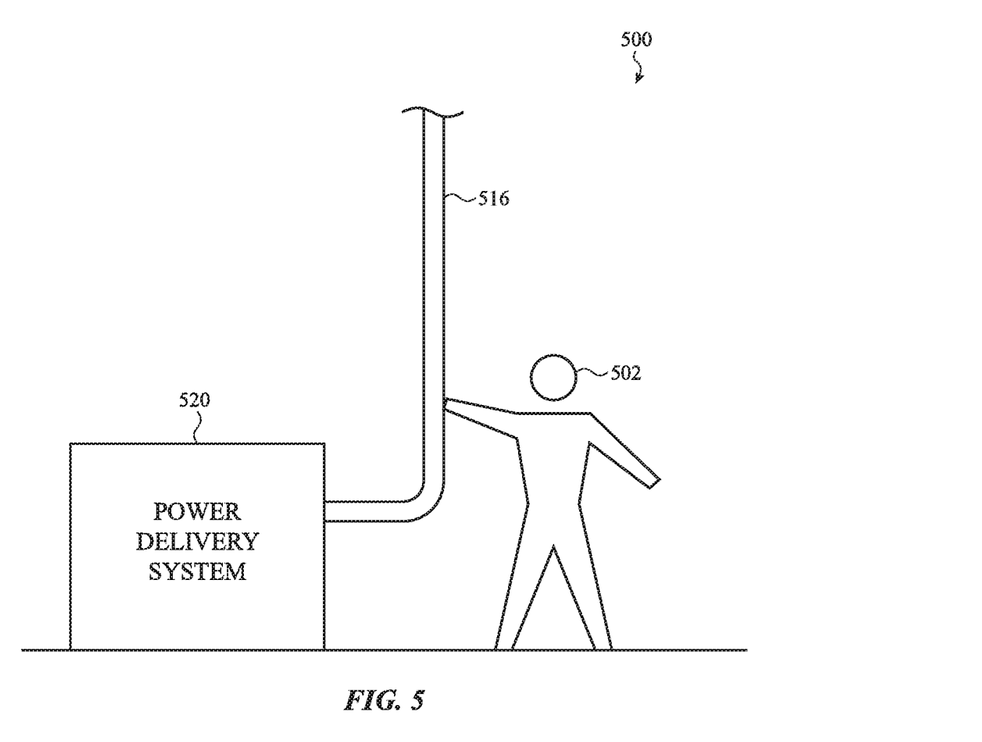
FIG. 5 illustrates a potential for contact between a ground-based operator and a hybrid cable or tether.

FIG. 5 illustrates a scenario 500 that presents a potential safety hazard or operational interrupt of a drone. In the exemplary situation shown, a power delivery system 520 uses a hybrid cable 516 to provide electrical power and communication channels to a drone (not shown). During airborne operation of the drone to provide wireless communication services, an operator 502 (or other human), an animal, or an object may come into contact with the hybrid cable 516. Depending on how the hybrid cable 516 is used to transmit or supply electrical power to the drone, a short circuit or ground fault could occur through the operator or object. Such a situation could cause a safety (electric shock) hazard to a human, or could cause a fire hazard. The embodiments described below are directed to mitigating negative events associated with such scenarios.

Figure 6A:
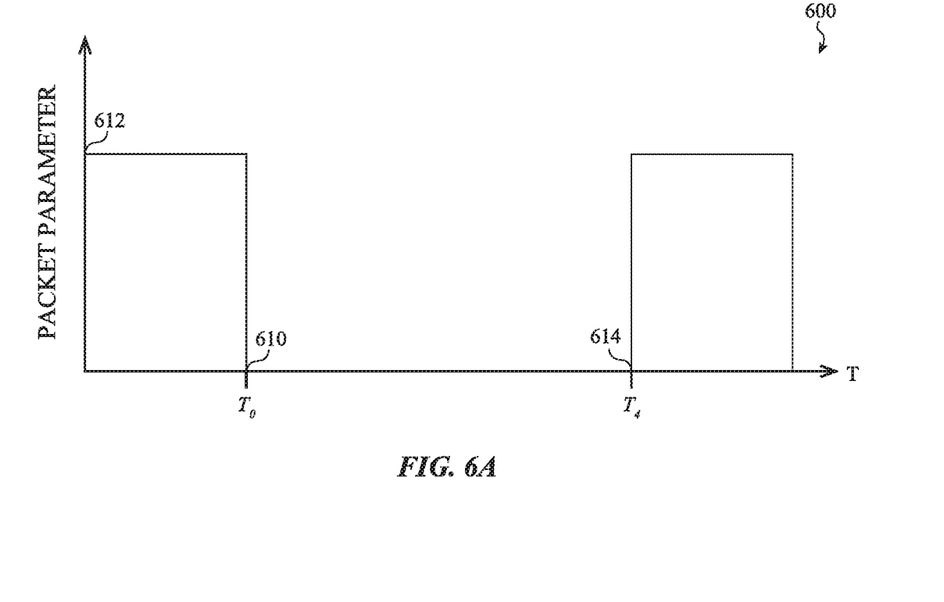
FIGS. 6A and 6B illustrate graphs of a transmission of a packet of electrical power and of an acknowledgement, according to an embodiment.

FIG. 6A is a graph 600 that shows an example transmission of electrical power, from a power delivery system (e.g., the power delivery system 520 described with reference to FIG. 5), to a drone (e.g., the drone 310 described with reference to FIG. 3), over an electrical power supply line (e.g., one of the power feeds 402*a*, 402*b*, ... 402*n* described with reference to FIG. 4). The horizontal axis of the graph shows time, and the vertical axis shows representative values of a parameter of the electrical power (e.g., a packet parameter), such as voltage, current, or power. During the time interval spanning t=0 to $T_0$ (610), electrical power is being transmitted. While the waveform of the transmitted electrical power is shown in graph 600 as a square wave, it is to be understood that the square wave may be an envelope of the actual transmitted electrical power waveform. The actual transmitted electrical power waveform may be an AC (sinusoid) waveform during that time interval, a sequence of DC pulses (optionally of different polarities), or have another nonzero waveform during that time interval. After time $T_0$ (610), no electrical power may be transmitted until a time $T_4$ (614), as explained below. The electrical power transmitted to the drone may thus be transmitted as a packet, followed by a time period in which no electrical power is transmitted. The actual transmitted electrical power waveform may contain an initial or header component that identifies the packet, such as by transmission time, by position in a sequence, or by other means.

Figure 6B:
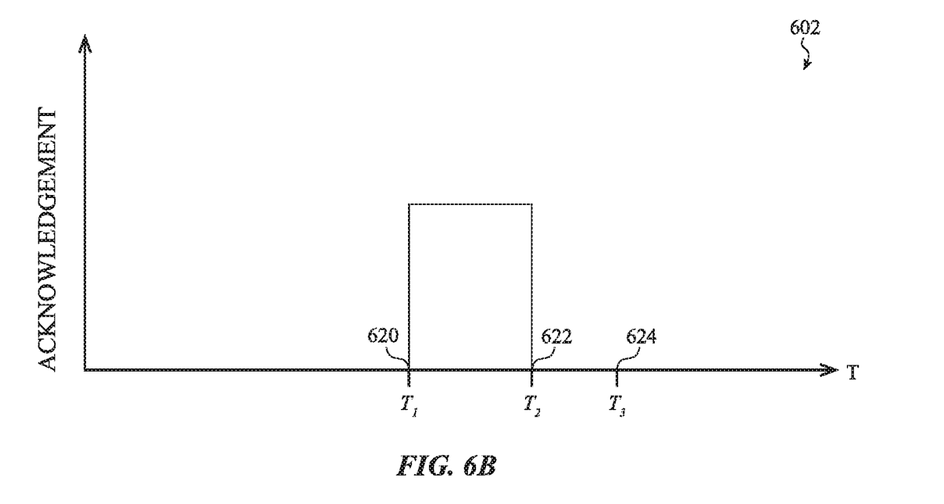

FIG. 6B shows a graph 602 having a horizontal time axis that correlates with the time axis in graph 600. The vertical axis represents a value of an acknowledgement (or reply) received at the power delivery system 520 from the drone 310. The reply may include a signal or message such as an electrical pulse, another waveform or signal, or a formatted data message. Such a message may contain header information identifying the packet of electrical power. The acknowledgement or reply may be received along a communication channel of the hybrid cable 516, such as one of communication channels 404*a-m*, or over a communication channel separate from the hybrid cable 516, such as a wireless communication channel operating between the drone 310 and the power delivery system 520. The vertical axis may be a value of an electrical parameter of the reply, such as a voltage, a current, a power, an optical signal or another parameter. The value of the electrical parameter is nonzero during the time interval from $t=T_1$ (620) to $T_2$ (622), but may vary (e.g., may be an AC voltage or a digital sequence) during that time interval.

The reply value or waveform received during the time interval from $t=T_1$ (620) to $T_2$ (622) may be such that the power delivery system 520 recognizes it as an acknowledgment (ACK) from the drone 310 of the successful receipt of the packet of electrical power sent from the power delivery system 520 during the time interval from t=0 to $T_0$ (610). In some embodiments, the ACK will not be received until after time $T_0$, as time is needed for the packet of transmitted electrical power to be completely received at the drone 310, for the drone 310 to determine that no problem occurred in the transmission and for the ACK to travel to the power delivery system 520.

The power delivery system 520 may take into account the length of the hybrid cable 516 from the power delivery system 520 to the drone 310 to determine an expected time of an arrival of the ACK from the drone 310. This expected time of arrival of the ACK may vary according to operating conditions either within the drone 310, the power delivery system 520, or the conditions of the environment in which the drone 310 or the power delivery system 520 is operating. The power delivery system 520 may calculate a maximum allowable time $T_3$ (624) in which to pause the transmission of electrical power and await reception of an ACK. If no ACK is received before time $T_3$ (624), the power delivery system 520 may then cease further transmissions of packets of electrical power, and enter a human warning mode, as explained further below.

If, alternatively, an ACK is received before the maximum allowable time $T_3$ (624), the power delivery system 520 may then proceed to transmit another packet of electrical power starting at time T4 (614). The process may repeat as long as the power delivery system 520 continues to receive ACK signals. Such a sequence of transmissions of electrical power in packets followed by a time interval of essentially zero electrical power transmission will be referred to herein as packetized electrical power transmission.

Various parameters of the packetized electrical power transmission may be set at the start of operation of the drone 310, or may be varied dynamically during operation of the drone 310. A first such parameter is the duration of the transmission of electrical power, i.e., the duration of the time interval from t=0 to $T_0$ (610). Another parameter is the duration of the time interval between starts of transmissions of the electrical power, i.e., the time interval from t=0 to T4 (614). Another parameter is the amplitude (such as of voltage or current) of the transmitted electrical power. In embodiments in which the transmitted electrical power is transmitted as a sinusoidal or AC waveform, the frequency may be varied dynamically, or set at a fixed frequency.

Figure 7:
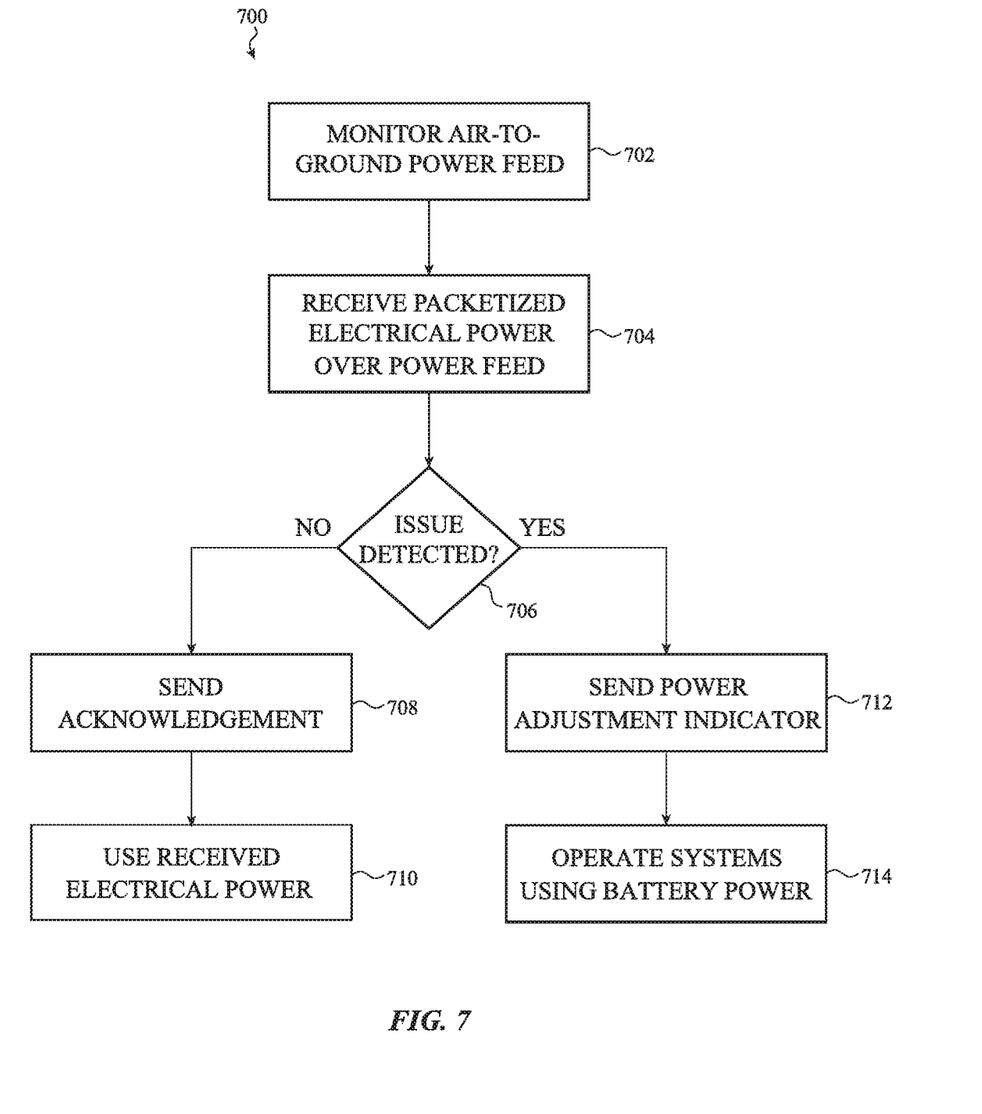
FIG. 7 is a flow chart of a method of operating a drone, according to an embodiment.

FIG. 7 is a flow chart of a method 700 of operating a drone, such as the drone described with reference to any of FIGS. 2-5. The drone may be equipped with a drone propulsion system, a drone processing unit, and a power system configured to receive packetized electrical power over an air-to-ground power feed linked to a power delivery system. The drone may establish one or more communication links with the power delivery system. The method 700 may be performed during any of a pre-launch, launch, hover, or recovery phase of the drone.

At block 702, the drone may monitor the air-to-ground power feed. The monitoring may include detecting packets of electrical power. The monitoring may include measuring characteristics or parameters of the air-to-ground power feed and/or the packets of electrical power, such as noise level, voltage spikes, temperature, or another characteristic or parameter. In the embodiment of FIG. 3, the monitoring of the air-to-ground power feed may be performed by the power system and/or the drone processing unit.

At block 704, a packet of electrical power is received over the air-to-ground power feed from the power delivery system. One or more parameters of the received packet of electrical power may be measured, such as received power, a voltage or current amplitude, a frequency (such as when the electrical power is AC), a packet time duration, a period of the packet, a noise level of the packet, or another parameter.

At block 706, the one or more measured parameters of the received packet of electrical power may be analyzed, such as by the drone processing unit, to determine if a parameter lies within a determined allowable range or interval of values that indicates an acceptable packet of electrical power. The determined allowable range of values may be pre-programmed or dynamically provided by the power delivery system. For example, in the drone embodiment described with reference to FIG. 3, the determined allowable range of values may be pre-programmed into the drone processing unit, or dynamically supplied to the drone over a communication channel in the tether. If the parameter is within the determined allowable range of values, then no issue or problem is detected at block 706, and the method 700 may proceed to block 708. Otherwise, the method 700 may proceed to block 712.

At block 708, the drone may cause an acknowledgement to be sent to the power delivery system. As previously explained, the acknowledgment may be a signal or message sent on the communication link between the drone and the power delivery system. The acknowledgment may be a single pulse, a varying electrical waveform, a digital word, or have another format. The acknowledgment indicates to the power delivery system that the packet of electrical power was received without problem or issue by the drone.

At block 710, the drone may use the received packetized electrical power to power or charge internal components of the drone. For example, the received packetized electrical power may be provided to the drone's power system. The electrical power may be converted to an appropriate level and conditioned as needed. In the drone embodiment described with reference to FIG. 3, the electrical power may be supplied to a battery, or to the drone propulsion system, the drone processing unit, or the drone communication system.

If, at block 706, the monitored parameter is found to lie outside the determined allowable range of values that indicate an acceptable packet of electrical power, the drone processing unit or power system may determine that a problem arose during transmission or reception of the packet. A problem may arise, for example, because a person, animal, or object contacts the air-to-ground power feed and creates an electrical short to ground. As the problem may indicate the potential for an unsafe transmission of packets of electrical power over the air-to-ground power feed, the method 700 may proceed to block 712.

At block 712, the drone may send a power adjustment indicator (e.g., a cease transmission indicator) to the power delivery system. The power adjustment indicator may be sent on a communication channel within the air-to-ground power feed, or by an alternate communication link to the power delivery system. The alternate communication link may be used since detection of the problem may indicate that the air-to-ground power feed, or at least some its components, may be inoperable or in an unsafe or unreliable condition.

At block 714, the drone may configure its various systems to operate using power from the battery. For example, the drone processing unit may configure the power system to supply electrical power to the drone propulsion system and the drone communication system from the battery. The drone may then continue to operate its various systems using the battery, until the problem is resolved. For example, the drone may receive a resume transmission indicator (e.g., a signal or message) from the power delivery system on the communication link or channel, indicating that the problem has been resolved.

Figure 8A:
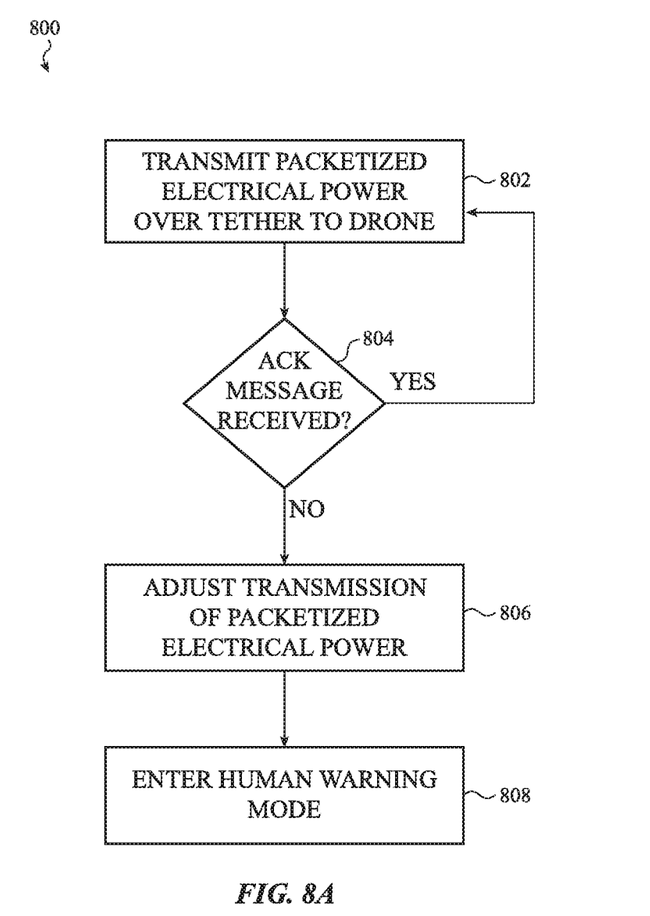
FIG. 8A is a flow chart of a method of operating a power delivery system that provides electrical power to a drone, according to an embodiment.

FIG. 8A is a flow chart of a method 800 of operating a power delivery system, such as the MBSE and power source described with reference to FIG. 2. The method 800 may be used to provide packetized electrical power to a drone, such as the drone described with reference to any of FIGS. 2-5.

At block 802, the power delivery system may transmit a packet of electrical power over a tether (e.g., a hybrid cable) to a drone. After transmitting the packet of electrical power, the power delivery system may wait for a period of time to receive an acknowledgment, such as the ACK described with reference to FIG. 6B.

At block 804, the power delivery system may monitor a communication link with the drone for an ACK message or signal. The communication channel may be one of the set of communication channels within the hybrid cable described with reference to FIG. 5, or may be a separate communication channel, such as a wireless communication channel. If an ACK is received before expiration of a maximum allowable time, the method 800 may return to block 802 and the power delivery system may transmit another packet of electrical power.

If, at block 804, an ACK is not received within the maximum allowable time, the method 800 may proceed to block 806 and the power delivery system may adjust (e.g., cease) transmission of packetized electrical power. At block 808, which may be performed concurrently with or subsequent to block 806, the power delivery system may enter a human warning mode of operation.

The human warning mode of operation may include intermittent transmissions of electrical pulses by the power delivery system, over one or more power feeds within the tether, or over a sheath of the tether (e.g., over one or more power lines or the sheath of the hybrid cable described with reference to FIG. 5). Such electrical pulses may be adjusted for at least one of duty cycle, period between pulses, or amplitude (voltage or current) so as to be within a safe operating range for human contact but still noticeable to a human. In this manner, a human in contact with the tether may be alerted to the fact that the tether is in carrying electrical power and should not be touched.

Figure 8B:
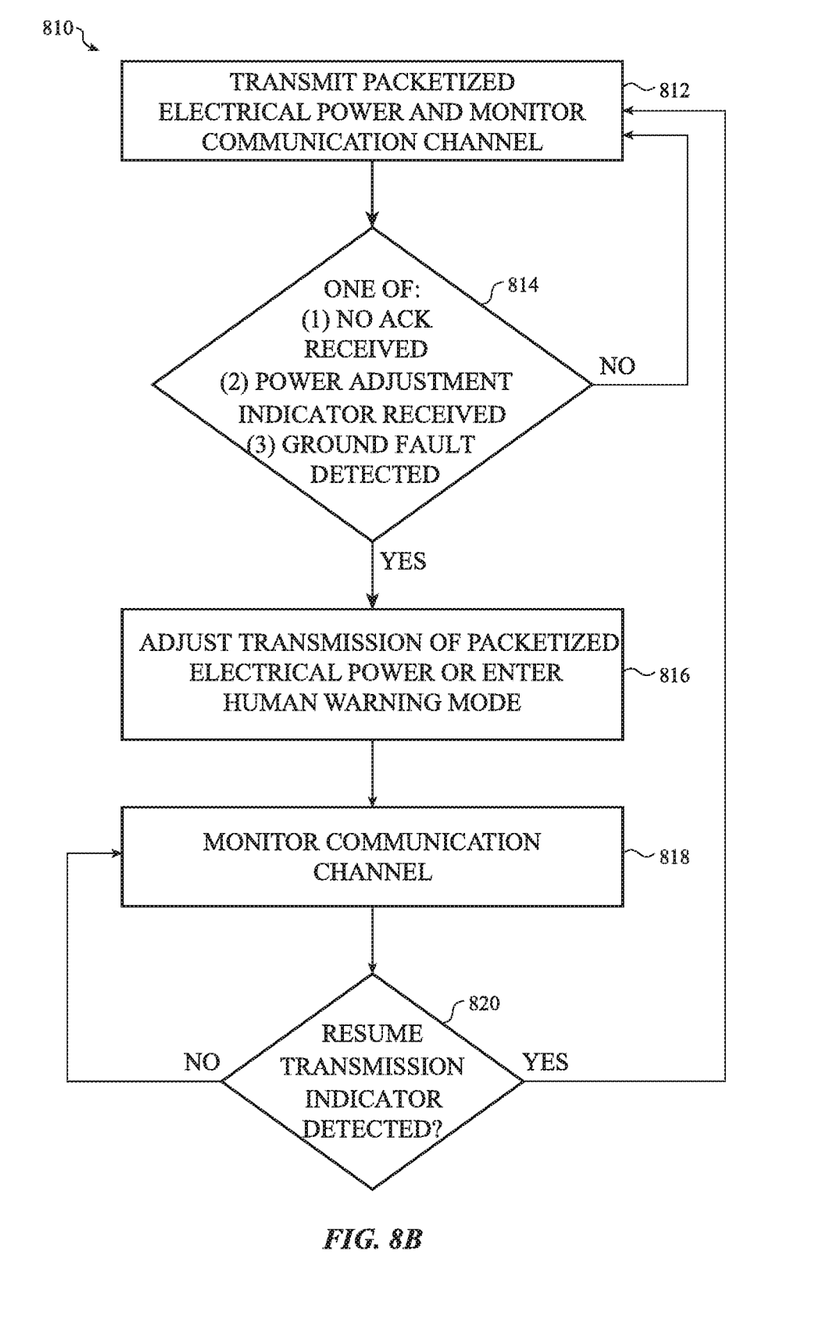
FIG. 8B is a flow chart of a method of operating a power delivery system that provides electrical power to a drone, according to an embodiment.

FIG. 8B is another flow chart of a method 810 of operating a power delivery system, such as the MBSE and power source described with reference to FIG. 2. The method 800 may be used to provide packetized electrical power to a drone, such as the drone described with reference to any of FIGS. 2-5.

At block 812, the power delivery system may transmit packetized electrical power to a drone over a tether (e.g., a hybrid cable). The transmission of the packetized electrical power may be as previously described. The power delivery system may also monitor a communication channel that provides a communication link between the drone and the power delivery system. As described above, the communication channel may be one of the communication channels described with reference to FIG. 5, or a separate communication channel, such as a wireless communication channel. After transmitting a packet of electrical power, the power delivery system may temporarily cease transmission of electrical power to await an acknowledgment, such as the ACK described with reference to FIG. 6B.

At block 814, the power delivery system may determine whether an ACK is received from the drone before expiration of a maximum allowable time. If the ACK is received, the method 810 may return to block 812 and the power delivery system may continue its transmission of packetized electrical power. If the ACK is not received, the method 810 may continue to block 816.

Alternatively, at block 814, the power delivery system may identify one or more indications that a problem may have interfered with its transmission of packetized electrical power. A first indication is that no ACK was received within the maximum allowable time. This may have been caused by an operational failure within the drone, a failure within the communication channel (even though the packet of electrical power was successfully received at the drone), or by another cause.

A second indication is that the power delivery system receives a power adjustment indicator (e.g., a cease transmission indicator) from the drone over the communication channel. The power adjustment indicator may be any type of signal, message, or waveform that is recognized by the power delivery system. The drone may send such a power adjustment indicator to alert the power delivery system that a problem arose in the reception of a packet, or that a packet did not arrive as expected. Such a problem may include, for example, receipt of a packet that did not have an expected voltage or current amplitude, duration, waveform, or other parameter. In some cases, the drone may send a power adjustment indicator when its operational programs determine that no further electrical power is needed from the power delivery system. This may occur, for example, if the battery is fully charged, when the drone is taking off or landing, or for another reason.

A third indication that a problem arose in the drone's reception of a packet of electrical power is an indication, received from a ground fault detection circuit, that a ground fault has occurred. The ground fault detection circuit may send a ground fault detected indicator (e.g., a message or signal) to the power delivery system when a current or voltage spike is detected during transmission of a packet of electrical power. In some cases, the ground fault detection circuit may transmit a ground fault cleared indicator, to the power delivery system, when a ground fault condition has cleared or been corrected.

If one the these three described indications occur, or if the power delivery system is instructed by an operator to adjust or cease transmission of packetized electrical power, the method 810 may proceed to block 816.

At block 816, the power delivery system may adjust (e.g., cease) transmission of packetized electrical power. In some cases, the power delivery system may also enter a human warning mode, as previously described.

At blocks 818 and 820, the power delivery system may monitor the communication channel and/or parameters of the tether or ground fault detection circuit to determine whether transmission of packetized electrical power can be resumed. If the power delivery system determines there is no reason to resume transmission of packetized electrical power, the method 810 may return to block 818, and the power delivery system may continue to monitor the communication channel and/or parameters of the tether or ground fault detection circuit.

There may be multiple reasons for the power delivery system to resume transmission of packetized electrical power. In one scenario, the power delivery system may resume transmission of packetized electrical power upon reception, from the drone, of a resume transmission indicator (e.g., a message or signal) on a communication channel. This may occur, for example, if the drone detects that the battery needs to be charged. In another example, the resume transmission indicator may be sent from an operator of the power delivery system.

Another reason to resume transmission of packetized electrical power may be the reception of a ground fault cleared indicator from the ground fault detection circuit.

If, at block 820, the power delivery system determines that a reason exists to resume transmission of packetized electrical power, the method 810 may return to block 812.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A drone, comprising:
   a propulsion system;
   a processing unit; and
   a power system having a battery and a power connection port;
   wherein:
   the power system is configured to receive packetized electrical power over a tether including an air-to-ground power feed attached to the power connection port;
   the power system is configured to supply electrical power to the processing unit, the battery, and the propulsion system; and
   the processing unit is configured to acknowledge receipt of the packetized electrical power.

2. The drone of claim 1, wherein the processing unit is configured to:
   monitor a value of a parameter of the received packetized electrical power; and
   in response to detecting that the value of the parameter is not within a determined allowable range of values:
   transmit a power adjustment indicator; and
   configure the power system to supply electrical power to at least the propulsion system from the battery.

3. The drone of claim 2, wherein the parameter of the received packetized electrical power includes at least one of: a received power, a voltage amplitude, a packet time duration, a frequency, a duty cycle, and a period of the received packetized electrical power.

4. The drone of claim 2, wherein the processing unit is configured to:
   acknowledge receipt of the packetized electrical power by transmitting an acknowledgement to a power delivery system using a communication channel within the tether, wherein the power delivery system is exterior to the drone and the drone receives the packetized electrical power from the power delivery system; and
   transmit the power adjustment indicator to the power delivery system on the communication channel.

5. The drone of claim 1, wherein the drone further comprises a communication system configured to:
   establish a wireless communication link with an electronic communication device; and
   establish a communication link with a communication network exterior to the drone.

6. The drone of claim 5, wherein the power system is configured to supply electrical power to the communication system.

7. A power delivery system, comprising:
   a packetized electrical power transmitter; and
   a processing unit; wherein the processing unit is configured to:

operate the packetized electrical power transmitter to transmit packets of electrical power over a tether attached to a drone; and monitor a communication channel within the tether for acknowledgements indicating the drone has received the transmitted packets of electrical power.

8. The power delivery system of claim 7, wherein the processing unit is configured to cause the packetized electrical power transmitter to adjust transmission of the packets of electrical power upon a failure to detect at least one of the acknowledgements.

9. The power delivery system of claim 7, wherein the processing unit is configured to:

monitor the communication channel within the tether for a power adjustment indicator received from the drone; and cause the packetized electrical power transmitter to adjust transmission of the packets of electrical power upon reception of the power adjustment indicator.

10. The power delivery system of claim 7, further comprising a ground fault detection circuit; wherein:

the processing unit is configured to cause the packetized electrical power transmitter to cease transmission of the packets of electrical power upon receiving a ground fault detected indicator from the ground fault detection circuit.

11. The power delivery system of claim 10, wherein the processing unit is configured to cause the packetized electrical power transmitter to resume transmission of the packets of electrical power upon receiving a ground fault cleared indicator from the ground fault detection circuit.

12. The power delivery system of claim 7, further comprising a ground fault detection circuit; wherein:

the processing unit is configured to cause the packetized electrical power transmitter to operate in a human warning mode upon receiving a ground fault detected indicator from the ground fault detection circuit.

13. The power delivery system of claim 12, wherein the human warning mode includes transmitting an electrical pulse on the tether, the electrical pulse being within a safe operating range.

14. The power delivery system of claim 7, wherein the processing unit is configured to cause the packetized electrical power transmitter to dynamically vary at least one parameter of the packets of electrical power.

15. The power delivery system of claim 14, wherein the at least one parameter of the packets of electrical power includes at least one of: a transmitted power, a voltage amplitude, a packet time duration, a frequency, a duty cycle, and a period of the packets of electrical power.

16. A method of operating a power delivery system configured to supply packetized electrical power to a drone over a tether, the method comprising:

causing the power delivery system to transmit packets of electrical power to the drone over the tether; and monitoring a communication channel between the power delivery system and the drone for acknowledgements indicating the drone has received the transmitted packets of electrical power.

17. The method of claim 16, further comprising causing the power delivery system to adjust transmission of the packets of electrical power upon at least one of a failure to detect at least one of the acknowledgements, or a reception of a power adjustment indicator received on the communication channel from the drone.

18. The method of claim 16, further comprising:

monitoring a ground fault detection circuit of the power delivery system; and causing the power delivery system to adjust transmission of the packets of electrical power upon detection of a ground fault by the ground fault detection circuit.

19. The method of claim 18, wherein causing the power delivery system to adjust transmission of the packets of electrical power comprises:

operating the power delivery system in a human warning mode; and causing the power delivery system to exit the human warning mode upon detection that the ground fault has cleared.

20. The method of claim 19, wherein the human warning mode includes applying an electrical pulse to a sheath of the tether, the electrical pulse being within a safe operating range.

* * * * *